(12) United States Patent
Wu et al.

(10) Patent No.: US 12,504,491 B2
(45) Date of Patent: Dec. 23, 2025

(54) HOUSING FOR SHIELDING AND AN IMAGING APPARATUS USING THE SAME

(71) Applicant: SHANGHAI UNITED IMAGING HEALTHCARE CO., LTD., Shanghai (CN)

(72) Inventors: Guanghe Wu, Shanghai (CN); Haojie Yi, Shanghai (CN); Peng Liu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 187 days.

(21) Appl. No.: 18/467,709

(22) Filed: Sep. 14, 2023

(65) Prior Publication Data
US 2024/0004014 A1 Jan. 4, 2024

Related U.S. Application Data

(63) Continuation of application No. PCT/CN2021/143695, filed on Dec. 31, 2021.

(30) Foreign Application Priority Data

Mar. 31, 2021 (CN) .......................... 202120667533.0
May 24, 2021 (CN) .......................... 202121128068.X (51) Int. Cl.
*G01R 33/48* (2006.01)
*A61B 6/00* (2024.01)
(Continued)

(52) U.S. Cl.
CPC ............ *G01R 33/481* (2013.01); *A61B 6/037* (2013.01); *A61B 6/107* (2013.01); *A61B 6/4417* (2013.01); *G01R 33/34* (2013.01); *G01R 33/36* (2013.01)

(58) Field of Classification Search
CPC ........ G01R 33/481; A61B 6/037; A61B 6/107
See application file for complete search history.

(56) References Cited

U.S. PATENT DOCUMENTS 7,835,782 B2 11/2010 Cherry et al.
2002/0123682 A1 9/2002 Allred, III et al.
(Continued)

FOREIGN PATENT DOCUMENTS

CN 109223019 A 1/2019
CN 215219188 U 12/2021
(Continued)

OTHER PUBLICATIONS

"PET-MRI: a review of challenges and solutions" by S. Vandenberghe et al. Phys Med Biol. 60 (2015).*
(Continued)

*Primary Examiner* — Jason M Ip
(74) *Attorney, Agent, or Firm* — METIS IP LLC (57) ABSTRACT

A housing in an imaging apparatus is provided. The imaging apparatus may include a Magnetic Resonance (MR) component and a Positron Emission Tomography (PET) component that includes a plurality of detectors. The housing may include one or more enclosed spaces configured to accommodate the plurality of detectors of the PET component. Each of the one or more enclosed spaces is defined by one or more walls.

17 Claims, 6 Drawing Sheets

(51) Int. Cl.
　　　*A61B 6/03*　　　(2006.01)
　　　*A61B 6/10*　　　(2006.01)
　　　*G01R 33/34*　　(2006.01)
　　　*G01R 33/36*　　(2006.01)

(56) References Cited

U.S. PATENT DOCUMENTS

| | | | |
|---|---|---|---|
| 2009/0146066 A1* | 6/2009 | Renz | A61B 6/037 250/363.04 |
| 2018/0231673 A1 | 8/2018 | Yan et al. | |
| 2019/0239747 A1 | 8/2019 | Fang et al. | |
| 2019/0317230 A1 | 10/2019 | Zheng et al. | |
| 2020/0011948 A1 | 1/2020 | Berneking et al. | |

FOREIGN PATENT DOCUMENTS

| | | | |
|---|---|---|---|
| CN | 215272856 U | 12/2021 | |
| WO | 2007105639 A1 | 9/2007 | |

OTHER PUBLICATIONS

The Extended European Search Report in European Application No. 21934715.0 mailed on Jul. 23, 2024, 8 pages.
International Search Report in PCT/CN2021/143695 mailed on Mar. 30, 2022, 5 pages.
Written Opinion in PCT/CN2021/143695 mailed on Mar. 30, 2022, 7 pages.

\* cited by examiner

HOUSING FOR SHIELDING AND AN IMAGING APPARATUS USING THE SAME

CROSS-REFERENCE TO RELATED APPLICATIONS

This application is a continuation of International Application No. PCT/CN2021/143695, filed on Dec. 31, 2021, which claims priority of Chinese Patent Application No. 202120667533.0 filed on Mar. 31, 2021, and Chinese Patent Application No. 202121128068.X, filed on May 24, 2021, the entire contents of each of which are hereby incorporated by reference.

TECHNICAL FIELD

The present disclosure generally relates to medical imaging technology, and more particularly, relates to a housing for shielding and an imaging apparatus using the same.

BACKGROUND

Positron Emission Tomography-Magnetic Resonance (PET-MR) is a hybrid imaging technique that incorporates both MR and PET. In a conventional PET-MR imaging apparatus, a PET component (e.g., including a plurality of detectors) for PET imaging and an MR component (e.g., including radio frequency (RF) coil assembly, a magnet assembly, a gradient magnet assembly) for MR imaging may be integrated.

The performance of a medical imaging apparatus may greatly influence the imaging result. For example, the plurality of detectors of the PET-MR apparatus may greatly affect the performance of PET imaging. During an imaging process by the PET-MR apparatus, the plurality of detectors of the PET component may operate in a varying magnetic field and a varying Radio Frequency (RF) field caused by the magnetic assembly and the RF coil assembly of the MR component. The RF field generated by the RF coil assembly may have an interference (e.g., an electromagnetic interference) on the plurality of detectors of the PET component, which may result in the inaccuracy of the plurality of detectors and/or cause the plurality of detectors to fail to work. Besides, the working of the PET component may also affect the distribution of the magnetic field of the MR component. Therefore, it is desirable to provide a housing for shielding with improved efficiency, which may avoid and/or reduce the electromagnetic interference of the RF coil assembly of the MR component on the plurality of detectors of the PET component, thereby ensuring the working performance of the plurality of detectors of the PET component and improving the accuracy of the plurality of detectors of the PET component.

SUMMARY

In an aspect of the present disclosure, a housing in an imaging apparatus is provided. The imaging apparatus may include a Magnetic Resonance (MR) component and a Positron Pmission Tomography (PET) component that may include a plurality of detectors. The housing may include one or more enclosed spaces configured to accommodate the plurality of detectors of the PET component. Each of the one or more enclosed spaces may be defined by one or more walls.

In another aspect of the present disclosure, an imaging apparatus is provided. The imaging apparatus may include a Magnetic Resonance (MR) component for MR imaging. The imaging apparatus may also include a Positron Emission Tomography (PET) component including a plurality of detectors for PET imaging. The imaging apparatus may further include a housing including one or more enclosed spaces for accommodating the plurality of detectors of the PET component. Each of the one or more enclosed spaces may be defined by one or more walls.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

For illustration purposes, the following description is provided to help better understand the present disclosure. It is understood that this is not intended to limit the scope of the present disclosure. For persons having ordinary skills in the art, a certain amount of variations, changes, and/or modifications may be deducted under the guidance of the present disclosure. Those variations, changes, and/or modifications do not depart from the scope of the present disclosure.

In some embodiments, a plurality of detectors (e.g., 10-35 detectors) of a PET component may be shielded individually. A traditional shielding housing for a detector may include walls with copper foil and/or any other proper metallic material to achieve the RF shielding. However, in the varying magnetic field caused by an MR component, the copper foil or the other metallic material adopted may cause a remarkable amount of eddy currents on the walls of the housing. The eddy currents may greatly interfere with the varying magnetic field, thereby reducing the performance of the MR component. Besides, the eddy currents may also generate a huge amount of heat, which may reduce the reliability of an PET-MR apparatus including the PET component and the MR component, and/or result in the metallic walls occurring bulges and/or crumbles, which may reduce the shielding performance of the shielding housing. In addition, the shielding of the plurality of detectors individually may increase a mounting burden and/or occupy a relatively large mounting space. What's more, traditionally, the PET component of the PET-MR apparatus can not be disassembled from the PET-MR apparatus for PET imaging alone. Therefore, it is desirable to provide a shielding housing that may provide a good RF shielding for the plurality of detectors and reduce the eddy currents resulting from the varying magnetic field, so as to improve the performances of the PET-MR apparatus.

An aspect of the present disclosure relates to a housing in an imaging apparatus. The imaging apparatus may include an MR component and a PET component that includes a plurality of detectors. The housing may include one or more enclosed spaces (also referred to as one or more shielding cavities) configured to accommodate the plurality of detectors of the PET component. Each of the one or more enclosed spaces may be defined by one or more walls. For instance, the housing may include a first wall, a second wall, a first electrical connection component, and a second connection component which form a single enclosed space for accommodating the plurality of detectors. The first electrical connection component may connect a first end region of the first wall and a first end region of the second wall. The second electrical connection component may connect a second end region of the first wall and a second end region of the second wall.

According to some embodiments of the present disclosure, the plurality of detectors of the PET component may be disposed in the single shielding cavity formed by the first wall, the second wall, and the electrical connection components of the housing, which can achieve an integral shield of the plurality of detectors from the electromagnetic interference of the RF coil assembly, reduce the mounting burden and save the mounting space for the plurality of detectors. The saved mounting space may be further used to accommodate a plurality of detectors each of which is with increased size (e.g., area) and/or more detectors for improving the imaging quality.

In some embodiments, the first wall of the housing may include a first shielding layer, a second shielding layer, and an insulating layer located between the first shielding layer and the second shielding layer. The first shielding may be closer to the RF coil assembly than the second shielding layer. The second shielding layer, the second wall, and the electrical connection components may form the shielding cavity to accommodate the detector of the PET component. Accordingly, the detector of the PET component may be close to the second shielding layer and far away from the first shielding layer, thereby reducing the interference on the detector of the PET component which is caused by the heat generated by the eddy currents on the first shielding layer.

In some embodiments, according to the position of the interference source (e.g., the RF coil assembly) with respect to the housing, the first wall may be set t be sleeved on the second wall or the second wall may be set to be sleeved on the first wall for achieving better shielding effect.

In some embodiments, the detector of the PET component may be mounted on a supporting component of an imaging apparatus (e.g., an PET-MR apparatus) including the PET component and the MR component via a mounting component of the housing. By using the mounting component, the detector of the PET component may be quickly disassembled from the imaging apparatus for PET imaging alone and/or quickly assembled with the imaging apparatus for PET-MR imaging, which adds the application scenarios of the imaging apparatus.

In some embodiments, the mounting component may include a positioning unit and a fixing unit. The positioning unit may be configured to assemble the detector of the PET component to a target position, which ensures the positioning accuracy of the PET component and improves the image fusion accuracy of the PET imaging and the MR imaging. The fixing unit may be configured to fix the detector of the PET component on the imaging apparatus, thereby improving the connection reliability of assembling the detector of the PET component with the MR component.

In some embodiments, the housing may further include one or more cushioning components. The cushioning component(s) may be configured to further support the PET component when assembling the PET component and the MR component and/or provide a cushioning function for the PET component when a vibration occurs.

Figure 1:
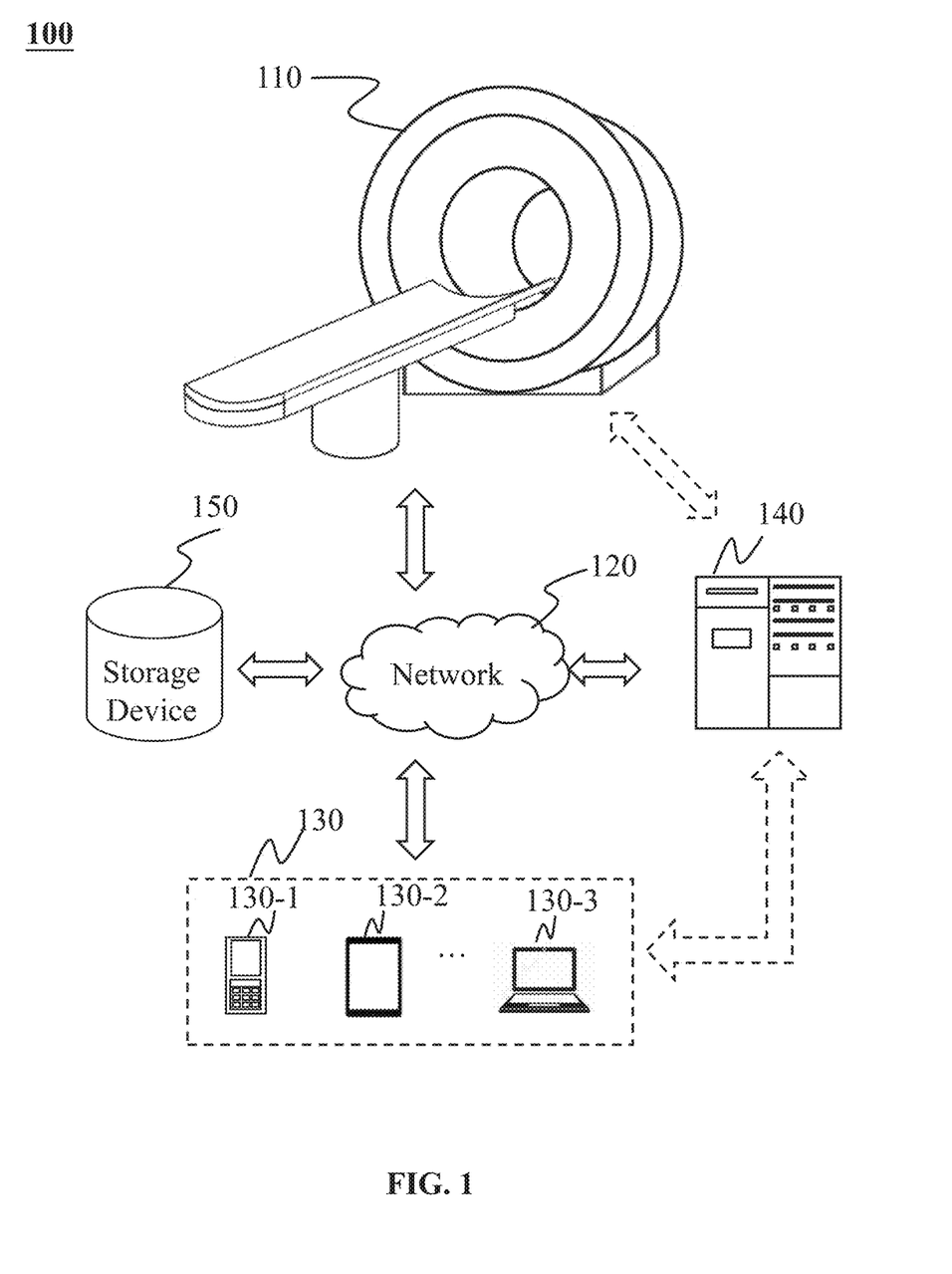
FIG. 1 is a schematic diagram illustrating an exemplary imaging system according to some embodiments of the present disclosure.

FIG. 1 is a schematic diagram illustrating an exemplary imaging system according to some embodiments of the present disclosure. As shown, the imaging system 100 may include an imaging apparatus (e.g., an PET-MR apparatus) 110, a network 120, one or more terminals 130, a processing device 140, and a storage device 150. In some embodiments, the imaging apparatus 110, the processing device 140, the storage device 150, and/or the terminal(s) 130 may be connected to and/or communicate with each other via a wireless connection (e.g., the network 120), a wired connection, or a combination thereof. The connection between the components in the imaging system 100 may be variable.

The imaging apparatus 110 may be configured to scan a subject (e.g., a biological object and/or a non-biological object) or a portion thereof so as to generate an image of the subject or the portion thereof. The image of the subject or a portion thereof may include an MR image, a PET image, or an PET-MR image of the subject or a portion thereof. The imaging apparatus 110 may include an MR component for MR imaging and a PET component for PET imaging. The MR component and the PET component may operate individually or concurrently to obtain scan data of the subject. When only one of the MR component and the PET component performs the scanning on the subject, the resulting scan image may be an MR image or a PET image. When the MR component and the PET component perform the scanning concurrently or collaboratively, both an MR image and a PET image of the subject may be obtained via a single scanning. In some embodiments, an PET-MR image may be obtained by fusing the MR image and the PET image. In some embodiments, the PET component may be detachably assembled with the MR component. Detailed descriptions of the imaging apparatus 110 may be found elsewhere in the present disclosure (e.g., FIG. 2 and the description thereof).

The network 120 may include any suitable network that can facilitate the exchange of information and/or data for the imaging system 100. In some embodiments, one or more components (e.g., the imaging apparatus 110, the terminal 130, the processing device 140, the storage device 150, etc.) of the imaging system 100 may communicate information and/or data with one or more other components of the imaging system 100 via the network 120.

The terminal(s) 130 may be configured to display information to a user and/or receive instructions of the user. The terminal 130 may include a mobile phone, a tablet computer, a laptop computer, a wearable device, a virtual reality device, an augmented reality device or the like, or any combination thereof. In some embodiments, the terminal 140 may be a part of the processing device 140, such as a remote controller of the processing device 140, a display screen, a mouse, a keyboard, a microphone, a loudspeaker, or the like, or a combination thereof.

The processing device 140 may process data and/or information obtained from one or more components (the imaging apparatus 110, the terminal(s) 130, and/or the storage device 150) of the imaging system 100. For example, the processing device 140 may process scan data acquired by the imaging apparatus 110 (e.g., scan data acquired by the PET component and/or the MR component of the imaging apparatus 100) and reconstruct an image based on the scan data. In some embodiments, the processing device 140 may be a single server or a server group. The server group may be centralized or distributed. In some embodiments, the processing device 140 may be local or remote. In some embodiments, the processing device 140 may be implemented on a cloud platform. In some embodiments, the processing device 140 or a portion thereof may be implemented by a computing device or a portion of the terminal 130.

The storage device 150 may store any data and/or instructions associated with the imaging system 100. In some embodiments, the storage device 150 may be connected and communicate with one or more other components in the imaging system 100 (e.g., the processing device 140, the terminal(s) 130, etc.) via the network 120 or directly. In some embodiments, the storage device 150 may be part of the processing device 140.

It should be noted that the descriptions of the imaging system 100 are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. The variations and modifications may include combining and/or splitting modules or sub-modules, adding or removing optional modules or sub-modules, etc. In some embodiments, the imaging apparatus 110 may also be another multi-modality imaging system including a device (or component) for MR imaging and/or PET imaging. All such modifications are within the protection scope of the present disclosure.

Figure 2:
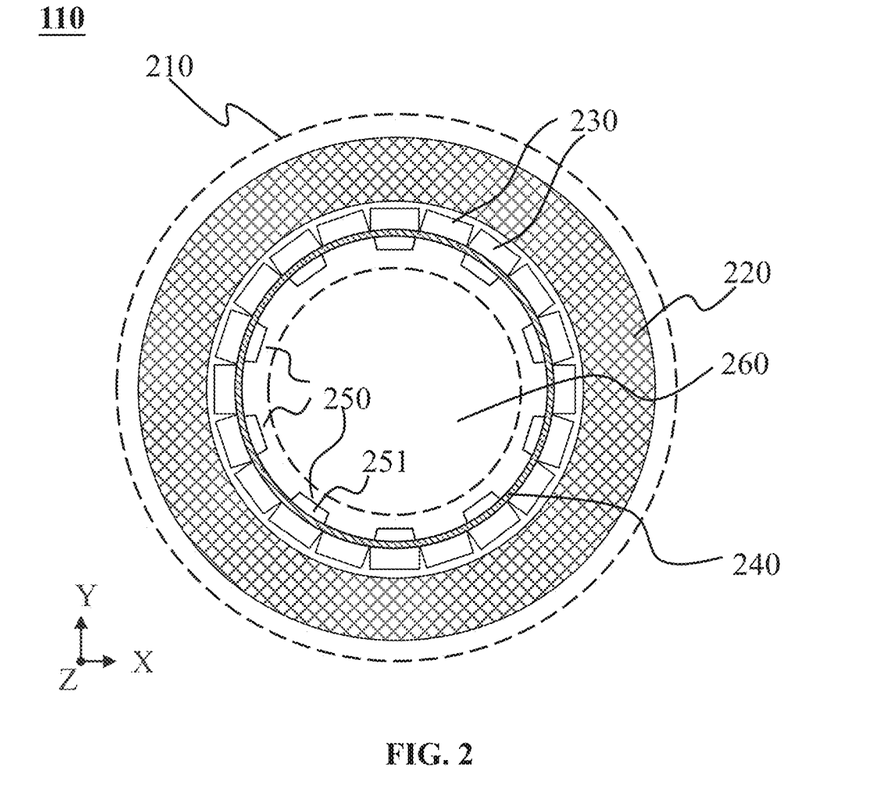
FIG. 2 is a cross-sectional view of an exemplary imaging apparatus according to some embodiments of the present disclosure.

FIG. 2 is a cross-sectional view of an exemplary imaging apparatus according to some embodiments of the present disclosure. The imaging apparatus 110 (i.e., an PET-MR apparatus) may include a casing 210 (e.g., broken lines in FIG. 2), an MR component, a PET component, a supporting component 240, or any other component (not shown). As shown in FIG. 2, the MR component may include a magnet assembly 220, an RF coil assembly 250, and a gradient coil assembly (not shown in FIG. 2). The PET component may include a plurality of detectors 230 and a housing (not shown). The casing 210 may enclose other components of the imaging apparatus 110 for protection. The magnet assembly 220, the RF coil assembly 250, and the gradient coil assembly may be for MR imaging. The plurality of detectors 230 may be for PET imaging and may be disposed in the form of one or more detection rings arranged along the Z axis. Each of the one or more detection rings may include multiple detectors arranged along the circumferential direction of the detection rings. The plurality of detectors 230 may be accommodated in the housing of the PET component.

The magnet assembly 220 may be configured to generate a static magnetic field (or be referred to as a main magnetic field) in a detection region 260 in which a subject (or a portion thereof) to be scanned is placed. The static magnetic field may polarize the subject for MR imaging.

As shown in FIG. 2, the magnet assembly 220 may form a hollow cylinder (also referred to as a first hollow cylinder) and provide an inner space (also referred to as a first inner space). As used herein, in some embodiments, the hollow cylinder may be a single-layer structure, and the hollow cylinder may be formed by a wall. An inner space of the hollow cylinder refers to a space enclosed by the wall of the hollow cylinder. A surface of the wall of the hollow cylinder that is close to the inner space may also be referred to as an inner surface of the wall of the hollow cylinder. A surface of the wall of the hollow cylinder that is away from the inner space may also be referred to as an outer surface of the wall of the hollow cylinder. For example, the magnet assembly 220 as a whole may be considered as the wall of the first hollow cylinder. The first inner space may be enclosed by the inner surface of the magnet assembly 220.

In some embodiments, the hollow cylinder may be a multi-layer structure, and the hollow cylinder may be formed by at least two walls (or layers) (e.g, an inner wall and an outer wall enclosing the inner wall). An inner space of the hollow cylinder refers to a space enclosed by an inner wall of the hollow cylinder. A space formed between the inner wall and the outer wall may refer to an intermediate space. For example, the magnet assembly 220 may include one or more superconducting magnets and a container (e.g., the cryostat) for accommodating the one or more superconducting magnets. The cryostat may be a multi-layer structure. A space (i.e., an intermediate space) may be between at least two layers of the cryostat for accommodating the one or more superconducting magnets. The first inner space may be enclosed by the innermost of the cryostat.

The plurality of detectors 230, the housing, the supporting component 240, the RF coil assembly 250, and the detection region 260 may be inside the first inner space.

The gradient coil assembly may generate magnetic field gradient pulses for localizing MR signals (e.g., for phase encoding or frequency encoding). The magnetic field gradient pulses may be in the X direction, the Y direction, and/or the Z direction (e.g., as illustrated in FIG. 2), and may form one or more gradient magnetic fields. The gradient coil assembly may form part of the magnet assembly 220 or be independent of the magnet assembly 220. For example, the gradient coil assembly may be inside the first inner space and between the housing and the magnet assembly 220.

The supporting component 240 may be configured to support one or more components of the imaging apparatus 110, such as the plurality of detectors 230 and/or the RF coil assembly 250. In some embodiments, the supporting component 240 may also form a hollow cylinder (also referred to as a second hollow cylinder) and provide an inner space (also referred to as a second inner space), as shown in FIG. 2. The second inner space may be a portion of the first inner space. The supporting component 240 may have an inner surface facing the detection region 260 and an outer surface away from the detection region 260 and facing the magnet assembly 220. The RF coil assembly 250 and the detection region 260 may be inside the second inner space, and the plurality of detectors 230 may be outside the second inner space. The plurality of detectors 230 may be located between the first hollow cylinder and the second hollow cylinder, i.e., between the magnet assembly 220 and the supporting component 240. For example, the outer surface of the supporting component 240 may include a region for mounting the plurality of detectors 230. As another example, the inner surface of the supporting component 240 may include a region for mounting the RF coil assembly 250.

The RF coil assembly 250 may be configured to generate radio frequency (RF) pulses to excite the subject and receive the MR signals responding to the RF pulses. The MR signals detected by the RF coil assembly 250 may be used to generate MR scan data, e.g., in the form of one or more K-space datasets. The MR scan data may further be processed by the processing device 140 to generate an MRI image. The RF pulses emitted by the RF coil assembly 250 may form an RF field. In some embodiments, the RF coil assembly 250 may include a plurality of coil units (e.g., a coil unit 251 as shown in FIG. 2).

The plurality of detectors 230 may be configured to detect radiation events (e.g., radiation photons) in the subject so as to generate a PET image. Each of the plurality of detectors 230 may include one or more PET detection cells each of which may generate an electric signal in response to a received annihilation photon. For example, each of the plurality of detectors 230 may include a scintillator array formed by bismuth germanate (BGO) scintillators coupled to photomultiplier tube array(s) (e.g., a single 2×2 photomultiplier tube array, 2 photomultiplier tube arrays, etc.). The BGO is the general name of $Bi_2O_3$—$GeO_2$ series compounds. The photomultiplier tube array(s) may include a position-sensitive photomultiplier tube array. Shapes of the plurality of detectors 230 may be the same or different.

In some embodiments, the magnet assembly 220, the RF coil assembly 250, the gradient coil assembly, the one or more PET detection rings formed by the plurality of detectors 230, and the supporting component 240 may be arranged coaxially, e.g., be coaxial with an axis parallel to the Z axis.

In some specific embodiments, the PET detection cell(s) of a detector of the plurality of detectors 230 may be sensitive to the RF field generated by the RF coil assembly 250. To reduce the interference (e.g., an electromagnetic interference) of the RF field on the PET imaging, o the PET component may include the housing for shielding the plurality of detectors 230 thereof from the RF field. The housing may include a multi-layer structure and/or the outer surface of the housing is sleeved by one or more cushioning components. In some embodiments, the housing may include one or more enclosed spaces for accommodating the plurality of detectors 230. The housing may allow the passing of annihilation photons and block (or absorb) RF fields generated by the RF coil assembly 250. More descriptions regarding the housing may be found elsewhere in the present disclosure (e.g., FIGS. 3-8 and the descriptions thereof).

It should be noted that the descriptions of the imaging apparatus 110 are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the imaging apparatus 110 may include several additional parts, such as a gantry for supporting the components of the imaging apparatus 110, the power system, the cooling system, the signal transmission system, the control system, etc., which are not illustrated in FIG. 2. In some embodiments, the plurality of detectors 230 and the detection region 260 may be inside the second inner surface of the supporting component 240, and the RF coil assembly 250 may be outside the second inner surface of the supporting component 240. For example, the outer surface of the supporting component 240 may include a region for mounting the RFcoil assembly 250, and the inner surface of the supporting component 240 may include a region for mounting the plurality of detectors 230.

Figure 3A:
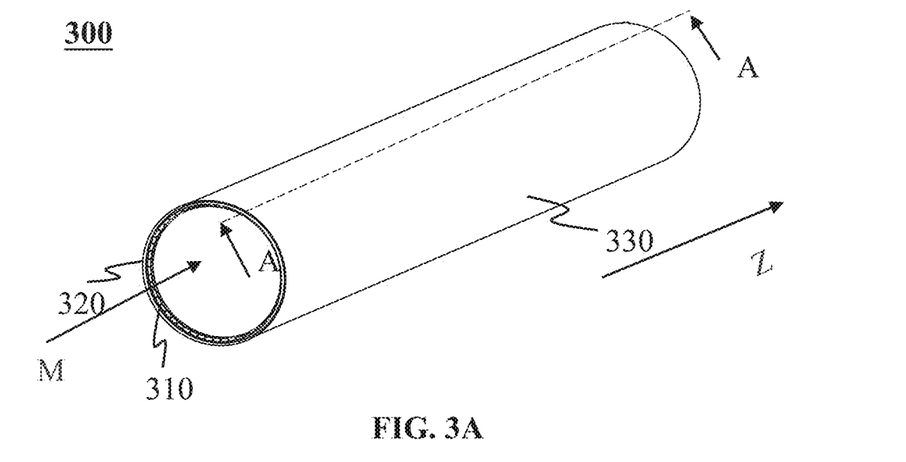
FIGS. 3A and 3B are schematic diagrams illustrating an exemplary housing according to some embodiments of the present disclosure.
Figure 3B:
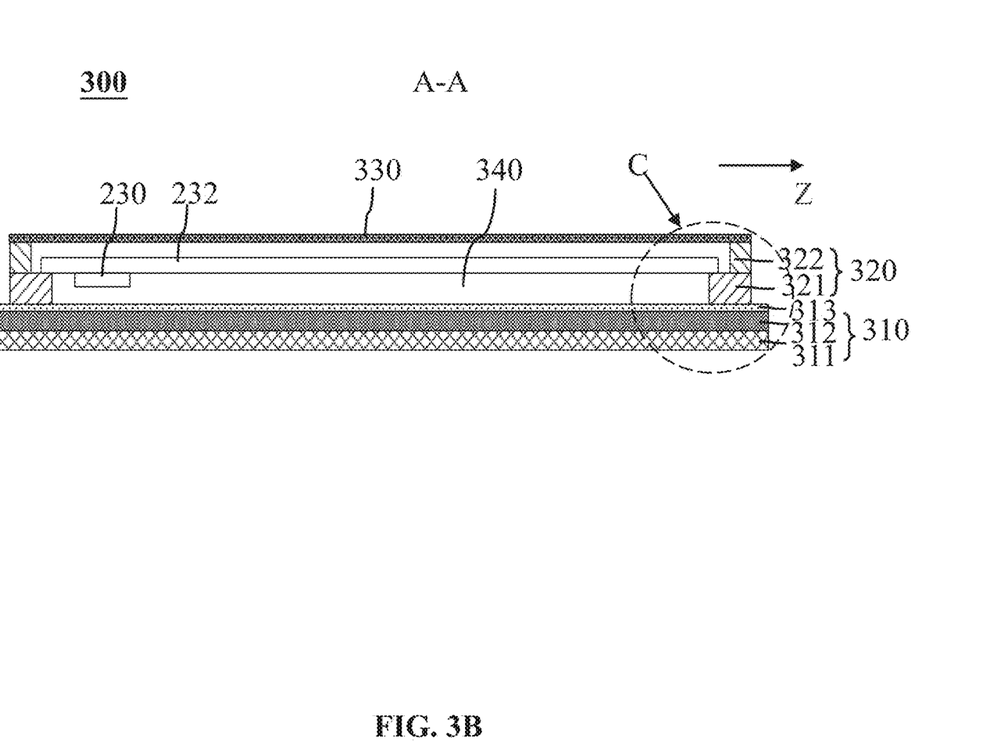
Figure 3C:
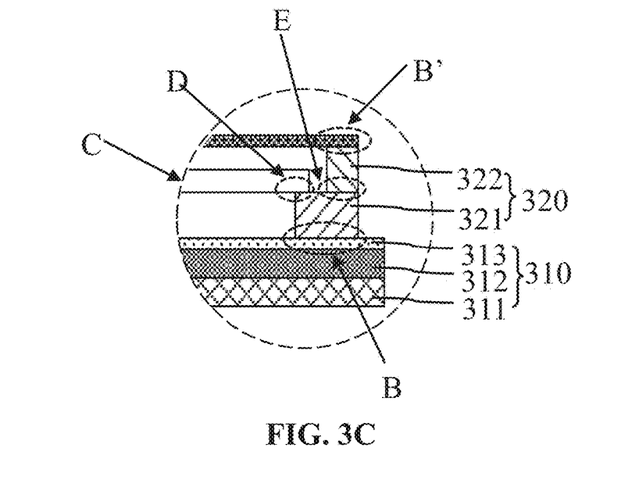
FIG. 3C is an enlarged view of an end portion of the housing illustrated in FIG. 3B according to some embodiments of the present disclosure.

FIGS. 3A and 3B are schematic diagrams illustrating an exemplary housing according to some embodiments of the present disclosure. FIG. 3B is a section view (denoted as A-A) of the housing 300 illustrated in FIG. 3A. FIG. 3C is an enlarged view of an end portion (denoted by C) of the housing 300 illustrated in FIG. 3B. The section view of the housing 300 may be parallel to the Z axis of the housing 300. The housing 300 may be applied in or be a part of a PET component of the imaging apparatus 110 as described in FIG. 1. For example, the PET component may include the housing 300 for accommodating a plurality of detectors (e.g., the plurality of detectors 230 as shown in FIG. 2) of the PET component for shielding. As another example, the housing 300 may be sleeved on the supporting component 240 as shown in FIG. 2.

As illustrated in FIGS. 3A and 3B, the housing 300 may include a first wall 310, a second wall 330, and two electrical connection components 320 (e.g., a first electrical connection component and a second electrical connection component). As used herein, the first wall 310 and/or the second wall 330 refers to a wall with a shielding function to electromagnetic interference (e.g., an RF filed generated by an RF coil assembly of the imaging apparatus), e.g., a wall made of a material that is electrically conductive and non-magnetic. The first wall 310, the second wall 330, and the two electrical connection components 320 may be arranged coaxially, e.g., be coaxial with an axis parallel to the Z axis. The first wall 310, the second wall 330, and the two electrical connection components 320 may form a single enclosed space (also referred to as a shielding cavity) 340 to accommodate the plurality of detectors 230. The coaxial axis parallel to the Z axis may also be referred to as a long axis of the single enclosed space (i.e., the single shielding cavity) 340. A radial direction of the single enclosed space 340 may be perpendicular to the Z direction and parallel to the X-Y plane. As shown in FIG. 3, the second wall 330 may be sleeved on the first wall 310. That is, the first wall 310 may be an inner wall of the housing 300, and the second wall 330 may be an outer wall of the housing 300. The single enclosed space 340 may be between the first wall 310 and the second wall 330. A space outside the single enclosed space 340 may also be referred to as a space outside the housing 300. For example, the space outside the housing may include an inner space (denoted by M as shown in FIG. 3A) formed (or enclosed) by the first wall 310 and a space that is outside an inner space formed (or enclosed) by the second wall 330. The inner space enclosed by the second wall 330 may include the enclosed space 340 and the inner space enclosed by the first wall 310.

The first wall 310 may form a hollow structure for providing the inner space M. The RF coil assembly (e.g., the RF coil assembly 250) of the imaging apparatus 110 may be located in the inner space M. The first wall 310 may be closer to the RF coil assembly than the second wall 330 to the RF coil assembly. The RF coil assembly may be mounted in the inner space 340 enclosed by the first wall 310.

In some embodiments, the first wall 310 may include a multi-layer structure. For example, the first wall 310 may include a first shielding layer 311, an insulating layer 312, and a second shielding layer 313. The first shielding layer 311 and/or the second shielding layer 313 may be configured to avoid or reduce an interference (e.g., an electromagnetic interference) of the RF coil assembly on the plurality of detectors 230. The insulating layer 321 may avoid current conduction between the first shielding layer 311 and other shielding layers (e.g., the second shielding layer 313 and/or the second wall 330). The first shielding layer 311 or the second shielding layer 313 may include a conductive structure without magnetism. The conductive structure without magnetism may be made of at least one of carbon fiber, carbon nanotube, metal, etc. For instance, the conductive structure may include a conductive film (e.g., a metal film made of copper sheet, or a film made of carbon nanotube), a conductive grid (e.g., a metal grid such as a copper grid), a flexible conductive structure (e.g., a conductive fabric made of carbon fiber), or the like, or any combination thereof. The insulating layer 312 may be made of resin, plastic, insulation paste, or the like, or any combination thereof.

In some embodiments, the insulating layer 312 may be sleeved on the first shielding layer 311, and the second shielding layer 313 may be sleeved on the insulating layer 312. The first shielding layer 311, the insulating layer 312, and the second shielding layer 313 may be arranged coaxially, e.g., be coaxial with an axis parallel to the Z axis (e.g., the Z axis of the housing, i.e., the long axis of housing). In some embodiments, the insulating layer 312, and the second shielding layer 313 may not move relative to each other (e.g., along the long axis direction and/or the radial direction). An inner surface of the insulating layer 312 may be attached to an outer surface of the first shielding layer 311. An outer surface of the insulating layer 312 may be attached to an inner surface of the second shielding layer 313. In such cases, the first wall 310 may have a function of fixation and/or support for the housing 300 besides the function of shielding. For example, an inner surface of the insulating layer 312 may be physically connected with an outer surface of the first shielding layer 311. An outer surface of the insulating layer 312 may be physically connected with an inner surface of the second shielding layer 313. As another example, a diameter of the insulating layer 312 may be greater than a diameter of the first shielding layer 311 by a first length threshold and be less than a diameter of the second shielding layer 313 by a second length threshold, such that the insulating layer 312 can not move relative to the first shielding layer 311 and the second shielding layer 313. As used herein, the diameter of a layer (e.g., the first shielding layer 311, the insulating layer 312, or the second shielding layer) refers to a distance between an outer surface of the object and the long axis of the housing 300 along the radial direction of the housing 300. In such cases, the first length threshold may be associated with (e.g., equal to) a length (i.e., thickness) of the insulating layer 312 along the radial direction of the housing 300. The second length threshold may be associated with (e.g., equal to) a length (i.e., thickness) of the second shielding layer 313 along the radial direction of the housing 300.

The second wall 330 may form a hollow cylinder which is similar to the first wall 310. A diameter of the second wall 330 may be greater than a diameter of the first wall 310 (e.g., the diameter of the second shielding layer 313), such that the second wall 330 can be sleeved on the first wall 310. An inner surface of the second wall 330 may be not attached to an outer surface of the first wall 310 (e.g., the outer surface of the second shielding layer 313), such that the first wall 310 and the second wall 330 can form a space between the first wall 310 and the second wall 330 in which the shielding cavity 340 for accommodating the plurality of detectors 230 is formed.

In some embodiments, the second wall 330 may include a single-layer structure, which is similar to the first shielding layer 311 and/or the second shielding layer 313. For example, the second wall 300 may include a shielding layer including a conductive structure without magnetism. As another example, the second wall 330 may be made of at least one of carbon fiber, carbon nanotube, metal, etc. For instance, the second wall 330 may include a conductive film (e.g., a metal film made of copper sheet, or a film made of carbon nanotube), a conductive grid (e.g., a metal grid such as a copper grid), a flexible conductive structure (e.g., a conductive fabric made of carbon fiber), or the like, or any combination thereof. Alternatively, the second wall 330 may include a multi-layer structure which is similar to the first wall 330. In some embodiments, the second wall 330 may be configured to reduce or avoid interference of the RF coil assembly on the plurality of detectors 230, which is similar to the first shielding layer 311 and/or the second shielding layer 313. In addition, the second wall 330, as the outer wall of the housing 300, may provide a function of sealing protection, decorative appearance, etc., for the plurality of detectors 250.

The two electrical connection components 320 may be located at two ends of the housing along the long axis for connecting the first wall and the second wall. For example, a first electrical connection component of the two electrical connection components 320 may be located at a first end of the housing and a second electrical connection component of the two electrical connection components 320 may be located at a second end of the housing. The two electrical connection components 320 may be electrically connected with two regions of the first wall 310 located at the two ends of the housing 300 (e.g., two end regions of the first wall 310), respectively. The two electrical connection components 320 may be electrically connected with two regions of the second wall 330 located at the two ends of the housing 300 (e.g., two end regions of the second wall 330), respectively. Accordingly, the first wall 310, the second wall 330, and the two electrical connection components may form the single enclosed space 340 for accommodating the plurality of detectors 230. For example, the first electrical connection component may connect a first region (e.g., denoted by B as shown in FIG. 3C) of the first wall 310 and a first region (e.g., denoted by B' as shown in FIG. 3C) of the second wall 320. Similarly, the second electrical connection component may connect a second region (not shown) of the first wall 310 and a second region (not shown) of the second wall 320. In some embodiments, each of the first region B, the first region B', the second region, and the second region may be an end region of its corresponding wall. That is, the first electrical connection component may connect a first end region of the first wall 310 and a first end region of the second wall 320, and the second electrical connection component may connect a second end region of the first wall 310 and a second end region of the second wall. In such cases, the enclosed space 340 may be formed for accommodating the plurality of detectors 230 as more as possible or to accommodate the plurality of detectors 230 each of which is with a relatively large size, thereby improving the PET imaging quality. In some embodiments, the two electrical connection components 320 may have a function for fixing the first wall 310 and the second wall 330, avoiding or reducing the first wall 310 from moving relative to the second wall 330 along any direction (e.g., the long axis direction and/or the radial direction).

In some embodiments, each (e. g, the first electrical connection component or the second electrical connection component) of the two electrical connection components 320 may include a first conductive ring 321 and a second conductive ring 322. The first conductive ring 321 may be sleeved on the first wall 310 (e.g., be sleeved on the second shielding layer 313). The second conductive ring 322 may be sleeved on the first conductive ring 311. The first conductive ring 321 may be electrically connected with the second conductive ring 322. The first conductive ring 321 and the second conductive ring 322 may be coaxial with the first wall 310 and the second wall 330. For example, an inner surface of the first conductive ring 321 may be electrically connected with the outer surface of the second shielding layer 313. An inner surface of the second conductive ring 322 may be electrically connected with an outer surface of the first conductive ring 321. A length (i.e., width) of the first conductive ring 321 along the long axis direction of the single enclosed space 340 may be greater than a width of the second conductive ring 322 along the long axis direction. The inner surface of the second conductive ring 322 may be connected with an end region (denoted by E as shown in FIG. 3C that is away from the shielding cavity 340) on the outer surface of the first conductive ring 321 to form a staircase structure (e.g., an L shape structure). Stairs (i.e., a portion of the outer surface of the first conductive ring 321 that does not contact with the inner surface of the second conductive ring 322) of the L shape structures may be configured to support the plurality of detectors 230. An outer surface of the second conductive ring 322 may be electrically connected with the inner surface of the second wall 330. Accordingly, the two electrical connection components 320, the first wall 310, and the second wall 330 may form the shielding cavity 340 for accommodating the plurality of detectors 230.

In some embodiments, the first conductive rings of the first electrical connection component and/or the second electrical connection component may be configured to support the plurality of detectors 230. For example, the PET component may further include a cooling plate 232. The calling plate 232 may be configured to cool the one or more PET detection cells 231 during PET imaging. The cooling plate 232 may be made of a heat conduction material such as a metal material, a ceramic material, a metal material, a ceramic material, or any other non-metal material having a good heat conductivity. The one or more PET detection cells of a detector 230 may be arranged on a surface of the cooling plate 232 (e.g., in an array). The cooling plate 232 may be mounted on the stairs (each of which is a portion of the first conductive ring 321 that does not contact with the second conductive ring 322) of the L shape structures. For example, each of two end regions (e.g., one of which is denoted by D as shown in FIG. 3B) of the cooling plate 232 may be connected with an end region (that is close to the shielding cavity 340) on the outer surface of a first conductive ring 321. The two end regions of the calling plate 232 may be on the surface of the cooling plate 232 that the detector is arranged. The cooling plate 232 may be supported by the first conductive rings 321, thereby the detector 230 mounted on the calling plate 232 may be supported by the first conductive rings 321. That is, the plurality of detectors 230 may be supported by the first conductive rings 321.

In some embodiments, a length (i.e., thickness) of the first conductive ring 321 along the radial direction may be greater than a length (i.e., thickness) of the detectors 230 along the radial direction, such that the detector 230 may be located in a space formed by the calling plate 232, the first conductive rings 321, and the second shielding layer 313. The thickness of the first conductive ring 321 may be a minimum distance from the outer surface to the inner surface of the first conductive ring 321.

In some embodiments, a rigidity of the first conductive ring 321 may be higher than a rigidity of the second conductive ring 322. The larger a rigidity of an object is, the less the object is prone to deformation. The rigidity of a conductive ring (e.g., the first conductive ring 321 and the second conductive ring 322) may be related to a size (e.g., the width, the thickness, etc.) and/or material of the conductive ring. For example, the width of the first conductive ring 321 along the long axis direction of the single enclosed space 340 may be greater than a width of the second conductive ring 322 along the long axis direction. As another example, the thickness of the first conductive ring 321 along the radial direction may be greater than the thickness of the second conductive ring 322 along the radial direction. As yet another example, the first conductive ring 321 may be made of a material with a first rigidity. The second ring 322 may be made of a material with a second rigidity. The first rigidity may be greater than the second rigidity. By setting the first conductive ring 321 with relatively high rigidity, the structural stability of the housing 300 may be ensured and/or improved. By setting the second conductive ring 322 with relatively low rigidity, a deformation of the second conductive ring 322 may be allowed during the assembling the second conductive ring 322 with the second wall 330, which improves the contact tightness between the second wall 330 and the electrical connection components 320, thereby improving the electrical connection performance between the second wall 330 and the electrical connection components 320 and improving the shielding effect of the shielding cavity 340.

In some embodiments, each of the electrical connection components 320 (e.g., the first conductive ring 321 and/or the second conductive ring 322) may be made of a material that is conductive and non-magnetic, including carbon fiber, carbon nanotube, metal, or the like, or any combination thereof.

As shown in FIG. 3A and FIG. 3B, the first wall 310, the second wall 330, the two electrical connection components 320 may be an integrated structure. For example, the first shielding layer 311, the insulating layer 312, the second shielding layer 313, the second wall 330, or each of the two electrical connection components 320 as shown in FIGS. 3A and 3B may be formed by mold pressing. As another example, the staircase structure of each of the two electrical components 320 may be an integrated structure. In some embodiments, a width of the first wall 310 along the long axis direction (i.e., the Z direction) may be the same as a width of the second wall 320 along the long axis direction. Alternatively, the width of the first wall 310 along the long axis direction may be greater than or less than the width of the second wall 320 along the long axis direction.

In some embodiments, the first wall 310 or the second wall 330 may include a plurality of sub-walls. For example, each of the first wall 310, and the second wall 330 as shown in FIGS. 3A and 3B may be formed by connecting a plurality of sub-walls end to end along a circumferential direction of the housing 300 that is perpendicular to the Z direction. Similarly, each of the electrical connection components 320 may include a plurality of sub-electrical connection components. For example, the first conductive ring 321 and/or the second conductive ring 322 may be formed by mold pressing. the first conductive ring 321 and/or the second conductive ring 322 may be formed by connecting the plurality of sub-conductive components end to end along the circumferential direction of the housing 300. A connection between the plurality of sub-walls or a connection between the plurality of sub-electrical connection components may include a mechanical connection, a bonding connection, a welding connection, or the like, or any combination thereof.

As another example, the first wall 310 may include a plurality of first sub-walls, and the second wall 330 may include a plurality of second sub-walls. The count of the first sub-walls may be the same as the count of the second sub-walls. Each of the first sub-walls may correspond to one of the second sub-walls, i.e., two corresponding first sub-wall and second sub-wall may be at the same Z position. The second sub-wall may be sleeved on the corresponding second sub-wall to form a space between the two corresponding first sub-wall and second sub-wall. The space between the two corresponding first sub-wall and second sub-wall may be configured to accommodate at least one detector among the plurality of detectors. Two ends (also referred to as end regions) of the two corresponding first sub-wall and second sub-wall may be sealed by two electrical connection components (e.g., the two electrical connection components 320) to form an enclosed space. The plurality of first sub-walls and the plurality of second sub-walls, and electrical connection components may form a plurality of enclosed spaces each of which is configured to accommodate at least one of the plurality of detectors, also referred to as sub-housings.

In some embodiments, during the process of assembling the plurality of detectors 230 in the housing 300, firstly, the first wall 310 (or the second wall 330) may be connected with the two electrical connection components 320. For example, the first conductive ring 321 may be sleeved and fixed on the second shielding layer 313. The second conductive ring 322 may be sleeved and fixed on the first conductive ring 321. Secondly, the plurality of detectors 230 may be input within the enclosed space (i.e., the shielding cavity) 340. For example, the cooling plate 232 may be fixed on the first conductive rings 321 after the first wall 310 (or the second wall 330) is assembled with the two electrical connection components 320. Finally, the second wall 330 (or the first wall 310) may be connected with the two electrical connection components 320. For example, the second wall 330 may be sleeved and fixed on the second conductive rings 322 after the plurality of detectors 230 are fixed in the shielding cavity.

It should be noted that the descriptions of the housing 300 are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the first wall 310 may include a single-layer structure. For example, the first wall 310 may include only the second shielding layer 313. In some embodiments, a count (or number) of the electrical connection components 320 may be greater than 2 as shown in FIGS. 3A and 3B. The housing 300 may include a plurality of (e.g., 3, 4, 5, etc.) electrical connection components 320. Merely by way of example, the plurality of detectors 230 may be disposed in the form of multiple PET detection rings arranged along the long axis direction. The plurality of electrical connection components 320 may be arranged between the first wall 110 and the second wall 330 along the long axis direction. The first wall 310, the second wall 330, and the plurality of electrical connection components 320 may form two or more enclosed spaces (i.e., two or more shielding cavities) arranged along the Z direction. For instance, two adjacent electrical connection components 320 of the plurality of electrical connection components 320, the first wall 310, and the second wall 330 may form an enclosed space for accommodating one of the multiple PET detection rings.

Figure 4A:
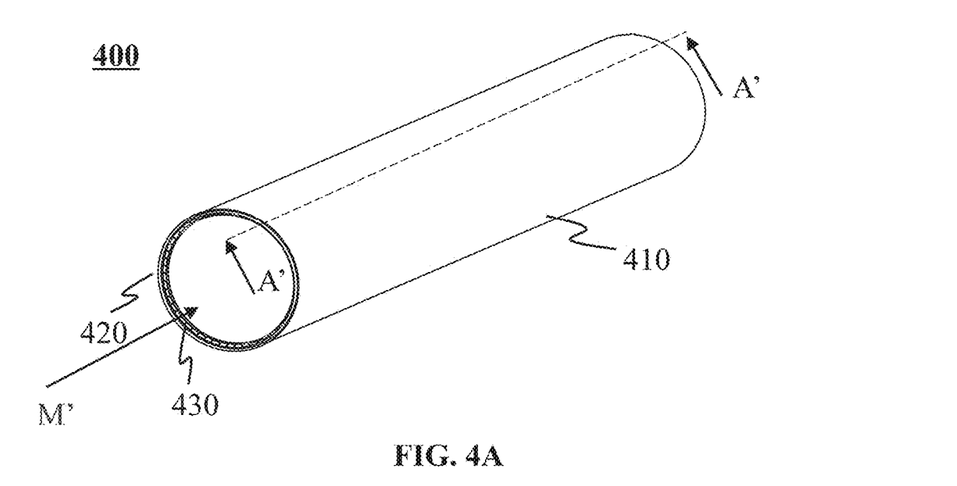
FIGS. 4A and 4B are schematic diagrams illustrating an exemplary housing according to some embodiments of the present disclosure.
Figure 4B:
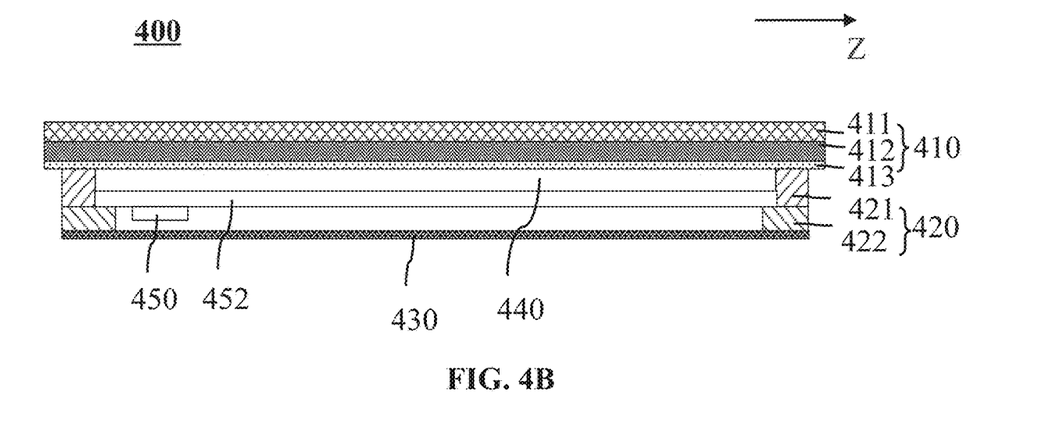

FIGS. 4A and 4B are schematic diagrams illustrating an exemplary housing according to some embodiments of the present disclosure. FIG. 4B is a section view (denoted as A'-A') of the housing 400 illustrated in FIG. 4A. The housing 400 may be applied in or be a part of a PET component of the imaging apparatus 110 as described in FIG. 1. For example, the PET component may include the housing 400 for accommodating a plurality of detectors of the PET component for shielding. A difference between the housing 300 as shown in FIGS. 3A and 3B and the housing 400 as shown in FIGS. 4A and 4B may include that the second wall 330 is sleeved on the first wall 310 of the housing 300, while the first wall 410 is sleeved on the second wall 430 of the housing 400.

As illustrated in FIGS. 4A and 4B, the housing 400 may include a first wall 410, a second wall 430, and two electrical connection components 420 (e.g., a first electrical connection component and a second electrical connection component). The first wall 410, the second wall 430, and/or the electrical connection components 420 may be made of a material that is electrically conductive and non-magnetic, which is similar to the material of the first wall 310, the second wall 330, and/or the electrical connection components 320 as described in FIG. 3B. The first wall 410 may be sleeved on the second wall 430. The first wall 410, the second wall 430, and the two electrical connection components 420 may form a single enclosed space (also referred to as a shielding cavity) 440 to accommodate a plurality of detectors 450 (each of which includes a PET detection cell 451, a cooling plate 452, etc.). The first wall 410 may be an outer wall of the enclosed space 440, and the second wall 430 may be an inner wall of the enclosed space 440. The first wall 410, the second wall 430, and the two electrical connection components 420 may be arranged coaxially, e.g., be coaxial with a long axis of the enclosed space 440.

The first wall 410 may form a hollow structure for providing an inner space M'. An RF coil assembly of the imaging apparatus 110 may be located outside the inner space (i.e., outside an outer surface of the first wall 410 or outside the housing 400). The first wall 410 may be closer to the RF coil assembly than the second wall 430 to the RF coil assembly. The RF coil assembly may be mounted outside the inner space formed by the first wall 410. In some embodiments, the first wall 410 may include a multi-layer structure including the first shielding layer 411, an insulating layer 412, and a second shielding layer 413, functions and materials of which are similar to the functions and materials of the first shielding layer 311, the insulating layer 312, and the second shielding layer 313 of the first wall 310 in FIG. 3B, respectively. The first shielding layer 411, the insulating layer 412, and the second shielding layer 413 may be arranged coaxially along the long axis of the enclosed space 440. The first shielding layer 411 may be sleeved on and attached to the insulating layer 412. The insulating layer 412 may be sleeved on and attached to the second shielding layer 413. The first shielding layer 411, the insulating layer 412, and the second shielding layer 413 may not move relative to each other along the long axis direction and/or a radial direction of the enclosed space 440. The multi-layer structure of the first wall 410 may help the housing 400 to shield the electromagnetic interference generated by the RF coil assembly located outside the outer surface of the housing 400.

The second wall 430 may form a hollow cylinder similar to the first wall 410. A diameter of the wall 430 may be less than a diameter of the first wall 410 (e.g., a diameter of the second shielding layer 413), such that the first wall 410 can be sleeved on the second wall 430. An outer surface of the second wall 430 may be not attached to an inner surface of the first wall 410 (e.g., an inner surface of the second shielding layer 413), such that the first wall 410 and the second wall 430 can form a space between the first wall 410 and the second wall 430 in which the shielding cavity 440 for accommodating the plurality of detectors 450 is formed. In some embodiments, the second wall 430 may include a single-layer structure, which is similar to the first shielding layer 411 and/or the second shielding layer 413.

Each of the two electrical connection components 420 may include a first conductive ring 421 and a second conductive ring 422. The first conductive ring 421 may be sleeved on and connected with the second conductive ring 422. The second conductive ring 422 may be sleeved on the second wall 430. The first conductive ring 421 and the second conductive ring 422 may be coaxial with the first wall 410 and the second wall 430. For example, an outer surface of the first conductive ring 421 may be electrically connected with an inner surface of the second shielding layer 413. An outer surface of the second conductive ring 422 may be electrically connected with an inner surface of the first conductive ring 421. For example, a length (i.e., width) of the first conductive ring 321 along the long axis direction of the single enclosed space 440 may be less than a length (i.e., width) of the second conductive ring 422 along the long axis direction. The inner surface of the first conductive ring 421 may be connected with an end region (that is away from the shielding cavity 440) on the outer surface of the second conductive ring 422 to form a staircase structure (e.g., an L shape structure). Stairs (i.e., a portion of the outer surface of the second conductive ring 422 that does not contact with the inner surface of the first conductive ring 421) of the L shape structures may be configured to support the plurality of detectors 450. For example, each of two end regions of the cooling plate 452 may be connected with an end region (that is close to the shielding cavity 440) on the outer surface of a second conductive ring 422. An inner surface of the second conductive ring 322 may be electrically connected with the outer surface of the second wall 330. In addition, a rigidity of the first conductive ring 421 may be lower than a rigidity of the second conductive ring 422. Accordingly, the two electrical connection components 420, the first wall 410, and the second wall 430 may form the shielding cavity 440 for accommodating the plurality of detectors 450.

It should be noted that the descriptions of the housing 400 are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the second wall 430 may include a multi-layer structure that is similar to the first wall 410 for further improving the shielding effect.

Figure 5:
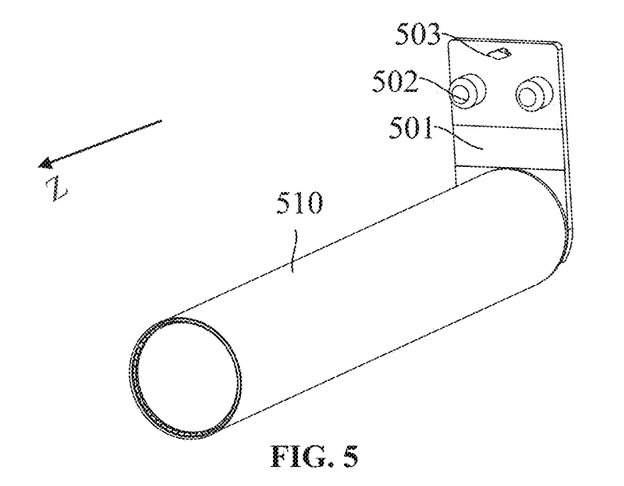
FIG. 5 is a schematic diagram illustrating an exemplary mounting component of a PET component in an imaging apparatus including an MR component according to some embodiments of the present disclosure.

FIG. 5 is a schematic diagram illustrating an exemplary mounting component of a PET component in an imaging apparatus including an MR component according to some embodiments of the present disclosure. As shown in FIG. 5, the mounting component 501 may be connected with a housing 510 accommodating a plurality of detectors (e.g., the plurality of detectors 230) of the PET component. In some embodiments, the mounting component 501 may be physically and detachably connected with the housing 510. In some embodiments, the mounting component 501 may also be referred to as a part of the housing 510. The housing 510 may be similar to the housing 300 or the housing 400 as described elsewhere in the present disclosure.

The mounting component 501 may be configured to detachably fix the PET component on the imaging apparatus 110 which includes the PET component and the MR component. That is, the mounting component 501 may be used to integrate the PET component with the MR component to form the PET-MR apparatus (i.e., the imaging apparatus 110).

In some embodiments, the mounting component 501 may include a plate structure. A mounting surface of the mounting component 501 may be perpendicular to a long axis of the housing 510 (that is parallel to the Z direction). The mounting component 501 may be mounted on an end surface (e.g., a side surface) of the housing 510 that is perpendicular to the long axis of the housing 510. The end surface of the housing 510 may be parallel to the mounting surface of the mounting component 501. In some embodiments, an area of the mounting surface may be greater than an area of the end surface of the housing 510. The mounting surface of the mounting component 501 may include a first region configured to be attached to the end surface of the housing 510 and a second region configured to be physically and detachably connected with a side surface of the imaging apparatus 110 (e.g., a side surface of the casing 210 of the imaging apparatus 110). For example, the end surface of the housing 510 may be attached to and fixed with the first region of the mounting surface.

The mounting component 501 may include a positioning unit 502 and/or a fixing unit 503 in the second region of the mounting surface. The positioning unit 502 may be configured to position the PET component, e.g., limit the plurality of detectors from moving along the circumferential direction of the housing 510 relative to the MR component. By the positioning unit 502, when assembling the PET component with the MR component, the positioning accuracy of the plurality of detectors may be ensured or improved, thereby improving the accuracy of image fusion. The positioning unit 502 may include one or more mechanical structures that are easy to be pulled in/out, e.g., a fixed stopper, a dowel pin, a plug, or the like, or any combination thereof. The positioning unit 502 may be made of a material that is non-magnetic and/or wear-resisting. The fixing unit 501 may be configured to fix the PET component relative to the MR component, e.g., limit a movement of the plurality of detectors from moving along the long axis direction of the housing 510 relative to the MR component. The fixing unit 503 may include one or more mechanical structure that is easy to be assembled/disassembled, e.g., a knob, a screw, a buckle, a bolt, a flange, or the like, or any combination thereof. By the fixing unit 503, the connection reliability of integrating the PET component and the MR component may be improved.

Figure 6A:
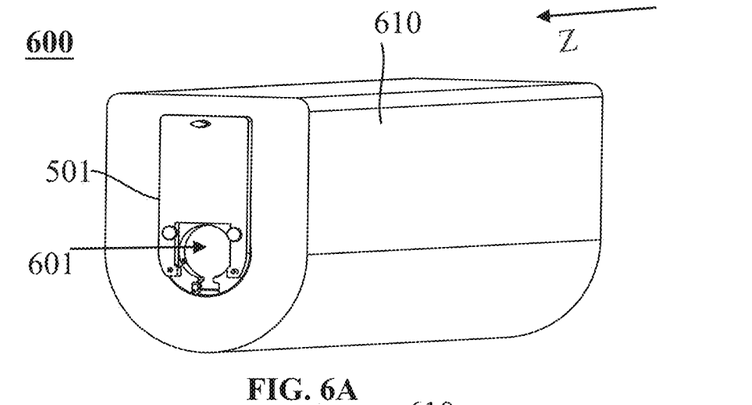
FIGS. 6A and 6B are schematic diagrams illustrating an exemplary imaging apparatus according to some embodiments of the present disclosure.
Figure 6B:
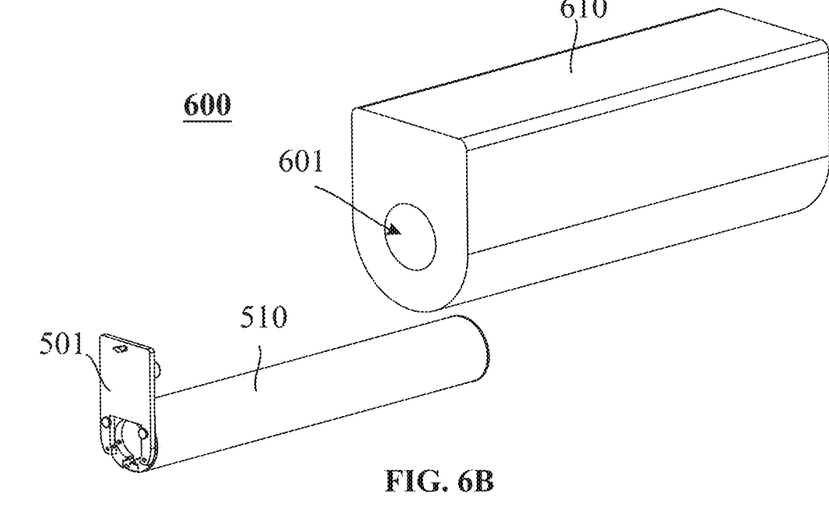

In some embodiments, the PET component within the housing 510 may be integrated with an MR component to form the imaging apparatus 600 as shown in FIG. 6A. FIG. 6B is a schematic diagram illustrating the MR component 610 and the PET component of the imaging apparatus 600 are disassembled. As shown in FIGS. 6A and 6B, the imaging apparatus 600 may include the MR component and the PET component, and a detection region 601 (which is similar to the detection region 260 as shown in FIG. 2). The MR component may include a magnet assembly 610, a gradient magnet assembly (not shown), an RF assembly (not shown), and other assemblies. The PET component may include a plurality of detectors that are accommodated in the housing 510. For example, the housing 510 may be arranged between the gradient magnet assembly and the RF coil assembly. The RF coil assembly may be closer to the detection region 601 than the housing 510 to the detection region 601, which is similar to a setting of the imaging apparatus 110 as shown in FIG. 2. As another example, the housing 510 may be arranged between the RF coil assembly and the detection region 610. The RF coil assembly may be farther away from the detection region 601 than the housing 510 from the detection region 601.

As shown in FIGS. 6A and 6B, the mounting component 501 may be located outside the detection region 601 and mounted on a side surface of the imaging apparatus 600. For example, the mounting component 501 may be detachably fixed on a side surface of a casing (e.g., casing 210) of the imaging apparatus. A connection between the mounting component 510 and the magnet assembly 610 may include a knob connection, a screw connection, a buckle connection, a bolt connection, a flange connection, or the like, or any combination thereof. By the detachable connection, the PET component may be conveniently and quickly assembled with and/or disassembled from the MR component (as shown in FIG. 6B), such that the PET component may be used singly or in combination with the MR component, which adds the application scenarios of the imaging apparatus 600.

In some embodiments, an imaging apparatus (e.g., the imaging apparatus 110 and/or the imaging apparatus 600) may include one or more cushioning components configured to support a PET component of the imaging apparatus. The one or more cushioning components may be sleeved on an outer surface of a housing (e.g., the housing 300, the housing 400, or the housing 510) that accommodates a plurality of detectors of the PET component. The one or more cushioning components may be arranged coaxially with the housing. A connection between the one or more cushioning components and the housing may include a mechanical connection, a bonding connection, or the like, or any combination thereof. In some embodiments, the one or more cushioning components may be attached to the outer surface of the housing or an outer surface of a wall of the housing. In some embodiments, the one or more cushioning components may also be referred to as a part of the housing.

In some embodiments, each of the one or more cushioning components may include at least one of a cushioning ring, multiple cushions, multiple supporting legs, etc. For example, a cushioning component may include a cushioning ring sleeved on the housing. As another example, a cushioning component may include multiple cushions attached to the outer surface of the housing and arranged along a circumferential direction of the housing (e.g., uniformly-spaced) or the long axis direction. Each of the multiple cushions arranged along the long axis direction may extend along the long axis direction. Each of the multiple cushions along the circumferential direction may extend along the circumferential direction. As yet another example, a cushioning component may include multiple supporting legs attached to the outer surface of the housing and arranged along the circumferential direction of the housing (e.g., uniformly-spaced) or the long axis direction. In some embodiments, the one or more cushioning components may be made of an insulating material such as rubber, resin, or plastic.

Figure 7:
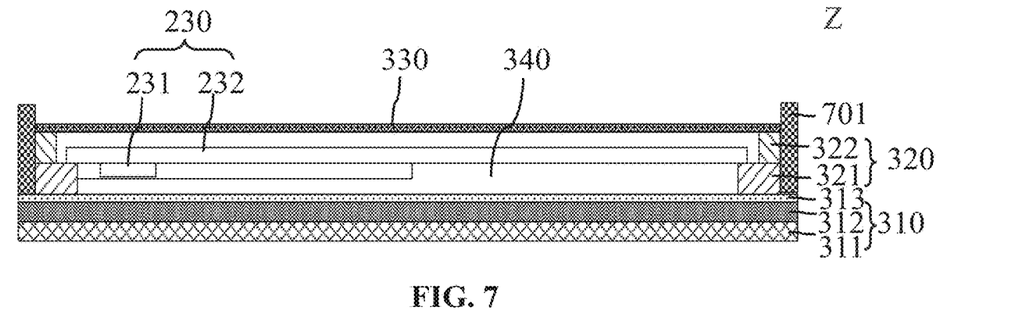
FIG. 7 is a schematic diagram illustrating an exemplary housing according to some embodiments of the present disclosure.

In some embodiments, when assembling the PET component with the MR component, the one or more cushioning components may have a function of vibration cushioning and local strengthening for the PET component, avoiding or reducing overloading of cantilever moment of the housing. For example, the one or more cushioning components (e.g., 3, 4, 5 cushioning components) may be arranged on the outer surface of the housing along a long axis direction of the housing avoiding or reducing the overloading of cantilever moment of the housing. As another example, two of the one or more cushioning components may be located at two end regions of the outer surface of the housing (or the outer surface of a wall of the housing) respectively. As yet another example, one of the one or more cushioning components may be located at a middle region of the outer surface of the housing (or the outer surface of a wall of the housing). For illustration purposes, the one or more cushioning components arranged on the housing 300 may be described in the following as shown in FIG. 7.

As described in connection with FIGS. 3A and 3B, the housing 300 may be arranged between an RF coil assembly of the MR component and a gradient magnet assembly of the MR component. For example, the gradient magnet assembly may be sleeved on the housing 300, the housing 300 may be sleeved on the supporting component 240, and the supporting component 240 may be sleeved on the RF coil assembly. The housing 300 may further include one or more cushioning components that are arranged along the long axis direction of the housing 300. The one or more cushioning components of the housing 300 may be between the gradient magnet assembly and contact an inner surface of the gradient magnet assembly. Merely by way of example, as shown in FIG. 7, the width of the second wall 330 along the long axis direction of the housing 300 may be less than the width of the first wall 310 along the long axis direction of the housing 300. The housing 300 may include one or more cushioning components (e.g., two rubber rings 701). The two rubber rings 701 may be located on two end regions of the housing 300 (e.g., two end regions of the first wall 310 that are protruding outside the second wall 330). A thickness of each of the rubber rings 701 along the radial direction of the housing 300 may be greater than a sum of a thickness of the electrical connection component 320 and a thickness of the second wall 330 along the radial direction of the housing 300, such that the housing 300 may not contact the inner surface of the gradient magnet assembly and the two rubber rings 701 may contact the inner surface of the gradient magnet assembly. Accordingly, the one or more cushioning components (e.g., the two rubber rings 701) may have a function for supporting the PET component.

It should be noted that the descriptions of the one or more cushioning components are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the housing 300 may include additional cushioning components sleeved on the outer surface of the housing and arranged between the two cushioning components 701. In some embodiments, the width of the second wall 330 along the long axis direction of the housing 300 may be equal to the width of the first wall 310 along the long axis direction of the housing 300. The two rubber rings 701 may be sleeved on the outer surface of the second wall 330.

Figure 8A:
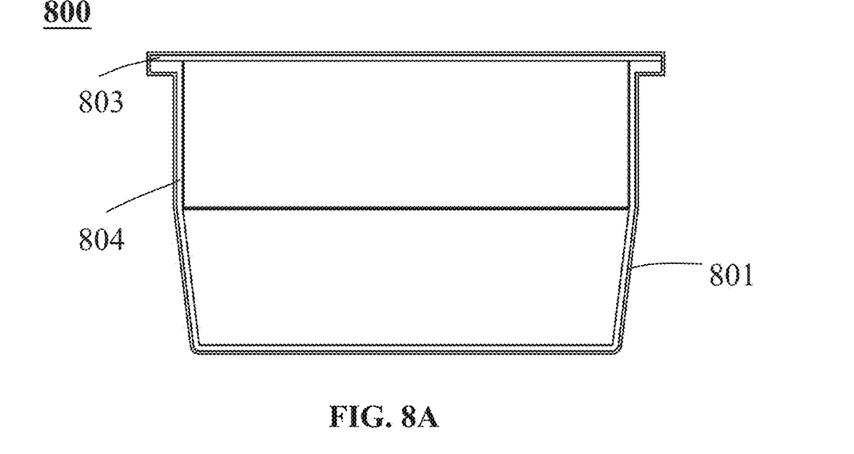
FIGS. 8A and 8B are schematic diagrams illustrating an exemplary shell of a housing according to some embodiments of the present disclosure.
Figure 8B:
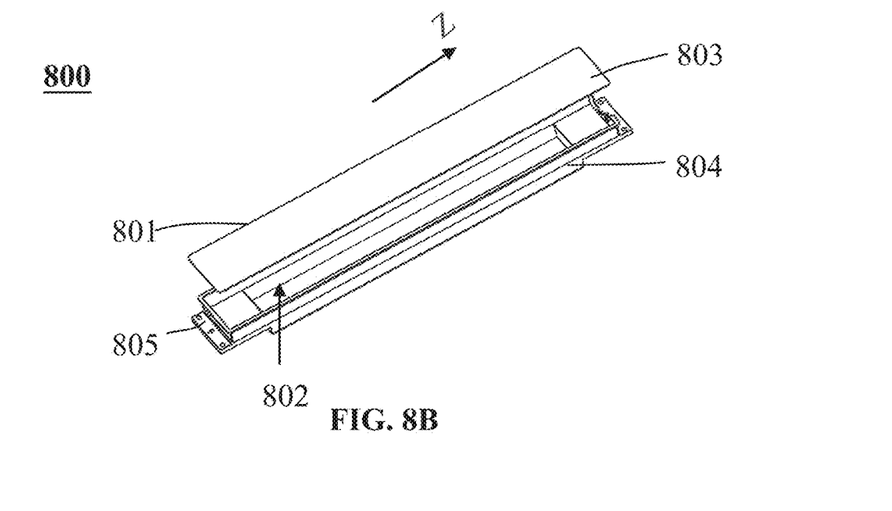

FIGS. 8A and 8B are schematic diagrams illustrating an exemplary shell of a housing according to some embodiments of the present disclosure. As described in FIG. 2, the housing may include one or more enclosed spaces for accommodating a plurality of detectors of a PET component. Each of the one or more enclosed spaces is defined by one or more walls. Each of the one or more enclosed spaces may be configured to accommodate at least one of the plurality of detectors. For example, the housing may include a plurality of shells (also referred to as sub-housings) 800. Each of the plurality of shells 800 may form one of the one or more enclosed spaces. That is, each of the plurality of shells 800 may be configured to accommodate at least one of the plurality of detectors. In some embodiments, the plurality of shells 800 may be arranged along a circumferential direction of the housing (which is perpendicular to the Z direction).

In some embodiments, each of the plurality of shells 800 may be covered by a shielding piece 801 that is conductive and without magnetic. For example, the shielding piece 801 may be covered on an outer surface of the shell 800. The shielding piece 801 may be made of at least one of carbon fiber, carbon nanotube, or any other similar material which may generate eddy currents less than a threshold. Merely by way of an example, the shielding piece 801 may include one or more carbon fiber sheets (or carbon fiber cloth) (e.g., one or more pieces of carbon fiber cloth). The piece of carbon fiber sheet may be with a relatively high weaving density, e.g., a weaving density of the piece of carbon fiber sheet may be greater than or equal to 500 gram/square meter. The piece of carbon fiber sheet may be made of carbon filaments weaved together in a crisscross or pressed in a single direction. As another example, the shielding piece 801 may include one or more carbon nanotube sheets (e.g., one or more carbon nanotube sheets). The piece of carbon nanotube sheet may be made of a plurality of carbon nanotubes spliced together.

In some embodiments, a connection between the shell 800 and the shielding piece 801 may include at least one of bonding connection, model pressing, etc. For example, a resin film may be set between the inner surface of the shielding piece 801 and the outer surface of the shell 800. According to a hot-melt heat and curing process, the inner surface of the shielding piece 801 may be bonded to the outer surface of the shell 800 via the resin film. As another example, the inner surface of the shielding piece 801 may be bonded to the outer surface of the shell 800 via the model pressing, which improves a bonding tightness between the shielding piece 801 and the shell 800, thereby improving bonding reliability and a mounting accuracy of the shell 800.

In some embodiments, the plurality of shells 801 may be made of a resin-based carbon fiber composite material, a metal material, or any other material that is conductive and non-magnetic. In some embodiments, each of the plurality of shells 800 may include a split structure including a plurality of sub-shells. The plurality of sub-shells may enclose an inner space 802 of the shell 800. The shielding piece 801 may include a plurality of sub-pieces. An outer surface of each of the plurality sub-shells of the shell 800 may be covered with a sub-piece of the plurality of sub-pieces of the shielding piece 801. For example, the shell 800 may include a first sub-shell (e.g., a wall) 803 and a second sub-shell (e.g., including multiple walls) 804. The first sub-shell 803 and the second sub-shell 804 may form the enclosed space 802. An outer surface of the first sub-shell 803 may be covered with a first sub-piece of the shielding piece 801. An outer surface of the second sub-shell 804 may be covered with a second sub-piece of the shielding piece 801.

In some embodiments, a count (or number) of the plurality of sub-pieces of the shielding piece 801 may be greater than or equal to a count (or number) of the plurality of sub-shells of the shell 800. A sum of areas of the plurality of sub-pieces of the shielding piece 801 may be greater than or equal to a sum of areas of the plurality of sub-shells of the shell 800. For example, an outer surface of each of the plurality of sub-shells may be covered with at least one sub-piece of the shielding piece 801. That is, a sub-shell of the shell 800 may be covered by one or more sub-pieces of the shielding piece 801. As another example, the second sub-shell 804 may include multiple walls. An outer surface of each of the multiple walls of the second sub-shell 804 may be covered by a sub-piece of the shielding piece 801. In some embodiments, two adjacent walls of the multiple walls of the second sub-shell 804 or two adjacent sub-shells (e.g., the second sub-shell 804 and the first sub-shell 803) may be connected with each other via a mechanical connection (e.g., a screw connection). A connection region between the two adjacent walls of the second sub-shell 804 or a connection region between two adjacent sub-shells may be covered with a sub-piece of the shielding piece 801. In such cases, the shielding effect of the shell 800 may be improved, thereby improving the shielding effect of the housing including the plurality of shells 800.

In some embodiments, each of the plurality of shells 800 may include one or more mounting interfaces 805. Each of the one or more mounting interfaces 805 may include a structure of a slot, a hole, a block, a screw, a bolt, a clamp, or the like, or any combination thereof. The mounting interface(s) 805 of the shell 800 may be configured to mount the shell 800 on an imaging apparatus (e.g., the imaging apparatus 110) including the PET component. For example, the shell 800 may be mounted on a supporting component (e.g., the supporting component 240) of the imaging apparatus via the mounting interface(s) 805 of the shell 805. When the shielding piece 801 and its corresponding shell 800 is integrated by the model pressing, the interface(s) 805 of the shell 800 may improve the mounting accuracy of the shell 800 (or the at least one detector in the shell 800), and a distribution of the plurality of detectors accommodated in the plurality of shells 800 may be uniformly-spaced, thereby improving the image quality of PET imaging and/or a fusion of PET imaging and MR imaging.

The housing may also include a mounting structure configured to mount the housing, or the PET detection module 1300, on the PET-MR scanner 110. The mounting structure may be or may include, for example, a slot, a hole, a block, a screw, a bolt, a clamp, or the like, or a combination thereof. In some embodiments, the mounting structure may be used to mount the PET detection module 1300 on the mounting section 301 or the supporting component 300 illustrated in FIG. 3.

According to some embodiments, an outer surface of the housing (e.g., including a plurality of shells) that is configured to accommodate a plurality of detectors of a PET component of an imaging apparatus may be covered by a plurality of pieces of conductive and non-magnetic sheets (also referred to as shielding sheets). For example, each of the plurality of shells may be covered with at least one piece of shielding sheet, such that the outer surface of the housing may have a shielding effect, thereby improving the imaging quality of the imaging apparatus. In some embodiments, the shell and the piece of shielding sheet may be integrated by a model pressing, which improves the mounting accuracy of the plurality of detectors, and a distribution of the plurality of detectors may be uniformly-spaces, thereby improving the image quality of the imaging apparatus.

It should be noted that the descriptions of the photon-counting detectors 600 and 700 are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure, and are within the spirit and scope of the exemplary embodiments of this disclosure.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A housing in an imaging apparatus, the imaging apparatus including a Magnetic Resonance (MR) component and a Positron Emission Tomography (PET) component that includes a plurality of detectors, wherein the MR component includes a Radio Frequency (RF) coil assembly, and the housing comprises:
   one or more enclosed spaces configured to accommodate the plurality of detectors of the PET component, wherein each of the one or more enclosed spaces is defined by a first wall and a second wall, and the first wall is closer to the RF coil assembly than the second wall to the RF coil assembly, the second wall is sleeved on the first wall and the RF coil assembly is located in an inner space formed by the first wall, or the first wall is sleeved on the second wall and the RF coil assembly is located outside an inner space formed by the first wall.

2. The housing of claim 1, wherein a count of the one or more enclosed spaces is equal to 1, and the housing further includes:
   a first electrical connection component connecting a first end region of the first wall and a first end region of the second wall; and
   a second electrical connection component connecting a second end region of the first wall and a second end region of the second wall, wherein the first electrical connection component, the second electrical connection component, the first wall, and the second wall form a single enclosed space for accommodating the plurality of detectors.

3. The housing of claim 1, wherein the first wall includes a first shielding layer.

4. The housing of claim 3, wherein the first wall further includes an insulating layer and a second shielding layer.

5. The housing of claim 4, wherein at least one of the first shielding layer, the second shielding layer or the second wall includes a conductive structure without magnetism.

6. The housing of claim 5, wherein the conductive structure without magnetism is made of at least one of carbon fiber, carbon nanotube, or metal.

7. The housing of claim 2, wherein the first electrical connection component or the second electrical connection components includes a first conductive ring and a second conductive ring, the first conductive ring being connected with the first wall, the second conductive ring being connected with the second wall, and the first conductive ring being connected with the second conductive ring.

8. The housing of claim 7, wherein a rigidity of the first conductive ring is higher than a rigidity of the second conductive ring.

9. The housing of claim 7, wherein a width of the first conductive ring along a long axis direction of the single enclosed space is greater than a width of the second conductive ring along the long axis direction.

10. The housing of claim 9, wherein the plurality of detectors are supported by the first conductive ring of the first electrical connection component and the first conductive ring of the second electrical connection component.

11. The housing of claim 1, further comprising a mounting component, the mounting component being configured to detachably fix the PET component on an imaging apparatus including the MR component and the PET component.

12. The housing of claim 1, further comprising one or more cushioning components configured to support the PET component, the one or more cushioning components being sleeved on an outer surface of the housing.

13. The housing of claim 12, wherein each of the one or more cushioning components includes at least one of a cushioning ring, multiple cushions, or multiple supporting legs.

14. The housing of claim 1, wherein a count of the one or more enclosed spaces exceeds 1, and each of the one or more enclosed spaces is configured to accommodate at least one of the plurality of detectors, the housing further including a plurality of shells, each of the plurality of shells forming one of the one or more enclosed spaces, and an outer surface of each of the plurality of shells being covered by a shielding piece that is conductive and non-magnetic.

15. The housing of claim 14, wherein each of the plurality of shells is covered with the shielding piece, and a connection between the shell and the shielding piece includes at least one of bonding connection or mold pressing.

16. The housing of claim 14, wherein each of the plurality of shells includes a plurality of sub-shells to form the corresponding enclosed space, and an outer surface of each of the plurality of sub-shells and a connection region between two adjacent sub-shells of the plurality of the sub-shells are covered with a sub-piece of the shielding piece.

17. An imaging apparatus, comprising:
a Magnetic Resonance (MR) component for MR imaging, wherein the MR component includes a Radio Frequency (RF) coil assembly;
a Positron Emission Tomography (PET) component including a plurality of detectors for PET imaging; and
a housing including one or more enclosed spaces for accommodating the plurality of detectors of the PET component, wherein each of the one or more enclosed spaces is defined by a first wall and a second wall, and the first wall is closer to the RF coil assembly than the second wall to the RF coil assembly, the second wall is sleeved on the first wall and the RF coil assembly is located in an inner space formed by the first wall, or the first wall is sleeved on the second wall and the RF coil assembly is located outside an inner space formed by the first wall.

* * * * *